US012423135B2

(12) United States Patent
Sodagar

(10) Patent No.: US 12,423,135 B2
(45) Date of Patent: Sep. 23, 2025

(54) METHOD AND APPARATUS FOR SWITCHING OR UPDATING PARTIAL OR ENTIRE WORKFLOW ON CLOUD WITH CONTINUITY IN DATAFLOW

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 677 days.

(21) Appl. No.: 17/702,977

(22) Filed: Mar. 24, 2022

(65) Prior Publication Data

US 2023/0020527 A1 Jan. 19, 2023

Related U.S. Application Data

(60) Provisional application No. 63/218,811, filed on Jul. 6, 2021.

(51) Int. Cl.
G06F 9/46 (2006.01)
G06F 9/48 (2006.01)
G06F 9/52 (2006.01)
H04L 67/10 (2022.01)

(52) U.S. Cl.
CPC .............. G06F 9/4881 (2013.01); G06F 9/52 (2013.01); H04L 67/10 (2013.01)

(58) Field of Classification Search
CPC ........... G06F 9/4881; G06F 9/52; H04L 67/10
See application file for complete search history.

(56) References Cited

U.S. PATENT DOCUMENTS

| | | | |
|---|---|---|---|
| 11,025,707 B1 * | 6/2021 | Luker | H04L 41/5054 |
| 2019/0028691 A1 | 1/2019 | Hinds et al. | |
| 2020/0092530 A1 | 3/2020 | Wang et al. | |
| 2020/0304508 A1 | 9/2020 | Bae et al. | |
| 2021/0096924 A1 | 4/2021 | Sodagar | |
| 2021/0390318 A1 * | 12/2021 | You | G06V 20/49 |
| 2022/0164453 A1 * | 5/2022 | Kammachi Sreedhar | G06F 21/10 |
| 2022/0167026 A1 * | 5/2022 | You | H04L 67/60 |

FOREIGN PATENT DOCUMENTS

WO 2020/188140 A1 9/2020

OTHER PUBLICATIONS

"Text of ISO/IEC FDIS 23090-8 Network-based media processing", ISO/IEC JTC1/SC29/WG 11, N19062, 2020, 105 pages.
International Search Report and Written Opinion of the International Searching Authority dated Aug. 11, 2022 in International Application No. PCT/US2022/023842.

* cited by examiner

Primary Examiner — Tammy E Lee
(74) Attorney, Agent, or Firm — Sughrue Mion, PLLC

(57) ABSTRACT

A method and apparatus for scaling a Network Based Media Processing (NBMP) workflow on a cloud platform. The method includes obtaining an input workflow including input media stream, determining at least one of scaling type information or transition type information for the input work flow; generating a updated workflow based on the determined at least one of the scaling type information or the transition type information and processing the updated workflow.

20 Claims, 6 Drawing Sheets

METHOD AND APPARATUS FOR SWITCHING OR UPDATING PARTIAL OR ENTIRE WORKFLOW ON CLOUD WITH CONTINUITY IN DATAFLOW

CROSS-REFERENCE TO RELATED APPLICATION

This application is based on and claims priority to U.S. Provisional Patent Application No. 63/218,811, filed on Jul. 6, 2021, the disclosure of which is incorporated by reference herein in its entirety.

FIELD

Embodiments of the disclosure relate to apparatuses and methods for seamless switching or updating of cloud workflows or parts of the cloud workflows without any interruption in data flow or missing any data.

BACKGROUND

A network and cloud platform may be used to run various applications. The Network Based Media Processing (NBMP) standard provides a specification for defining, instantiating, and running workflows on cloud platforms. The NBMP standard also includes a feature for updating a work flow. However, the work flow updating functionality of the NBMP standard does not have a functionality to define whether the flow of data needs to be continued, or a functionality to define that no data should be missed during the update. For instance, while a workflow may be updated in a related art method, the update does not necessarily take into account the data processed by the previous workflow, and such, there may be data loss during the update of the workflow. Moreover, while a related art method for updating a workflow has functionalities for creating, retrieving, and deleting workflow, the related art methods does not have a functionality to define whether the flow of data needs to be continued, so as to provide a graceful transition from an old workflow to a new and/or updated workflow without data loss.

One or more example embodiments of the disclosure may solve this issue and provide a seamless continuity in a workflows.

SUMMARY

One or more example embodiments of the disclosure provide a method and an apparatus for providing a seamless continuity in a workflow during an update in the workflow.

Updated after claims are added.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

Figure 1:
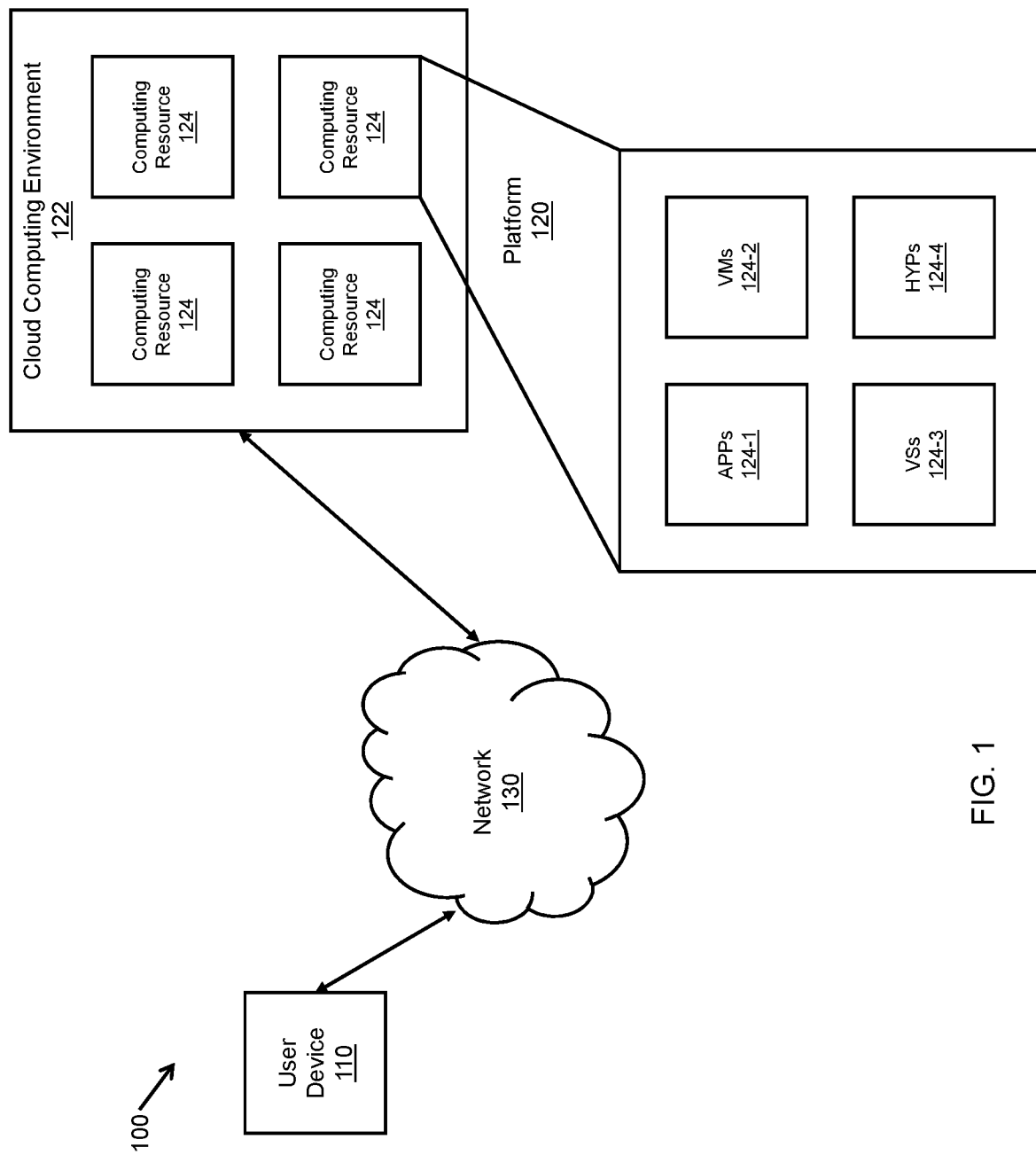
FIG. 1 is a schematic illustration of a communication system, according to one or more embodiments.

The disclosure relates to a method and an apparatus for signaling modifications in a network based media processing (NBMP) workflow without effecting the output of the workflow.

Embodiments of the disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute computer program code that is stored in a one or more non-transitory computer-readable media.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 may include one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 may include one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 may include an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 may include one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 may include one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 may include a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
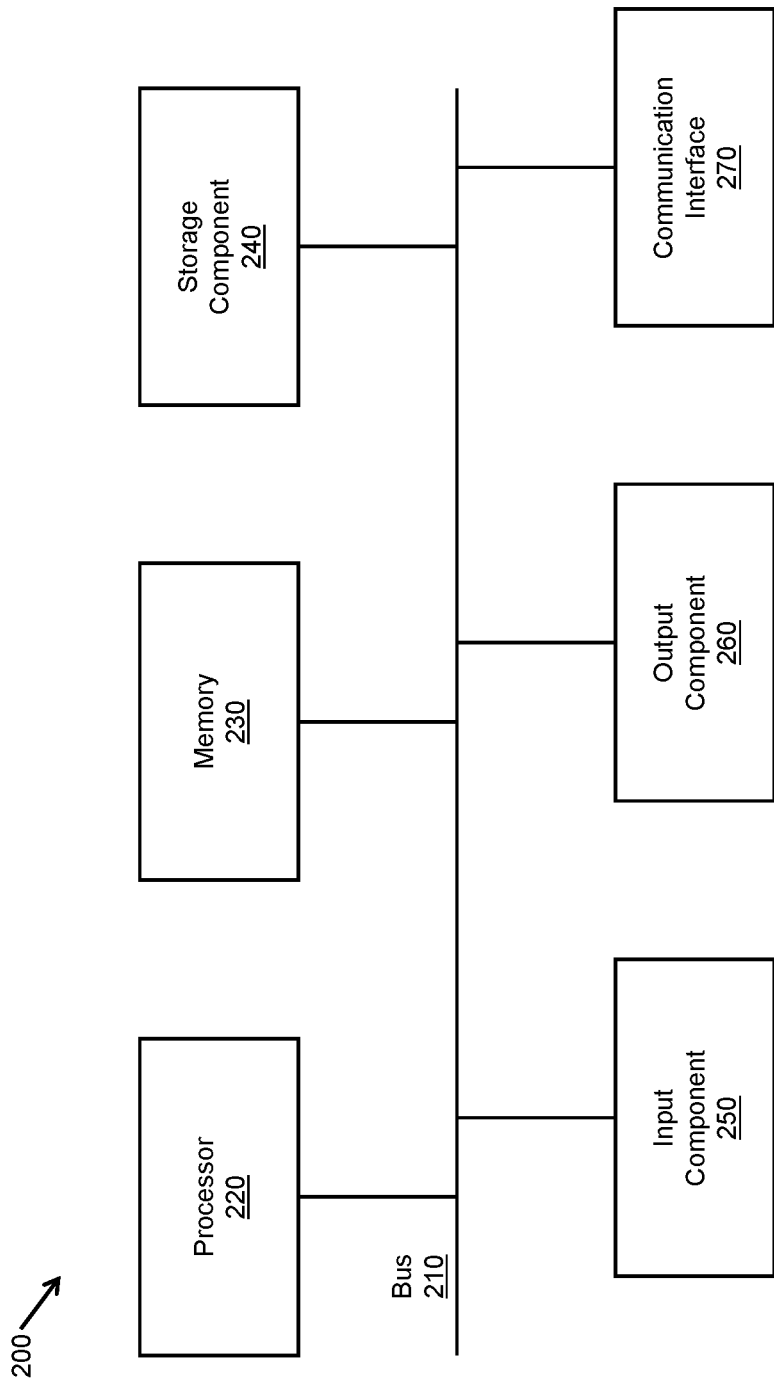
FIG. 2 is a simplified example illustration of a streaming environment, according to one or more embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 may include a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 may include a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
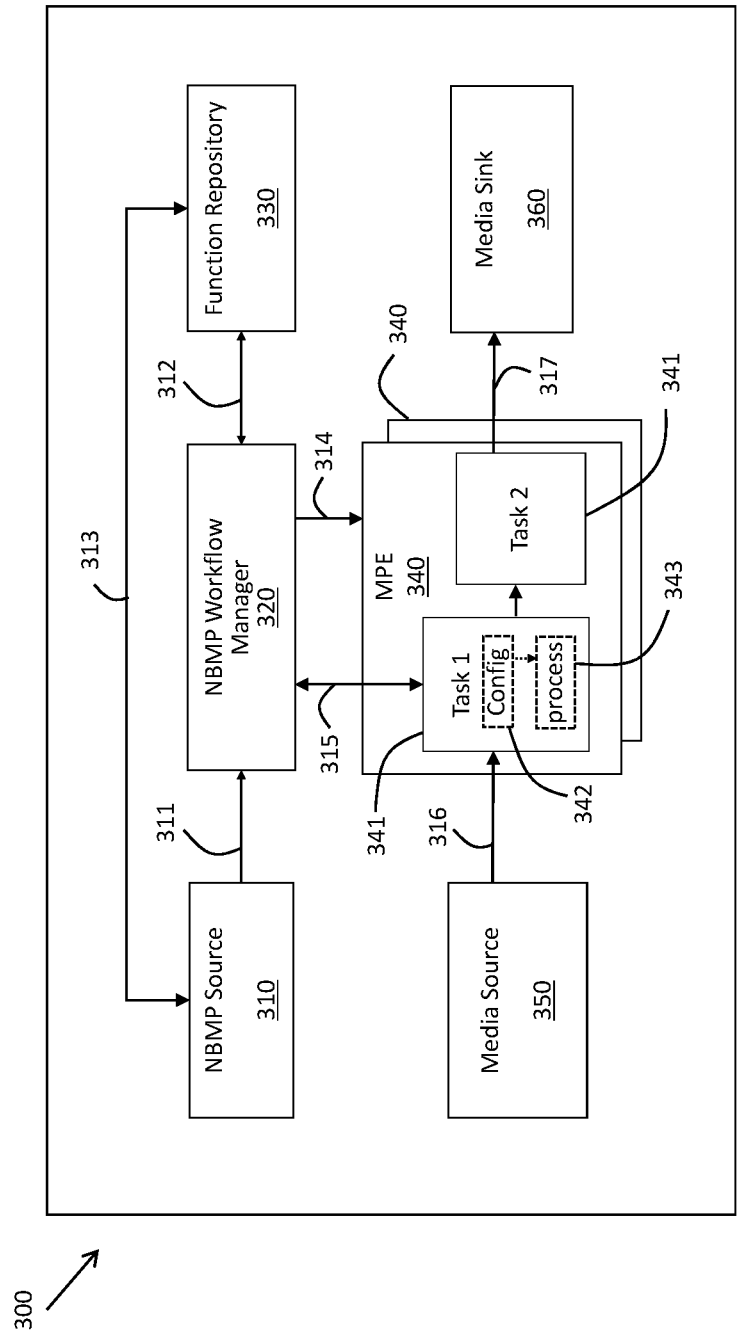
FIG. 3 is a block diagram of an NBMP system, according to one or more embodiments.

In an embodiment of the disclosure, a Network-Based Media Processing (NBMP) system is provided. FIG. 3 illustrates a NBMP architecture 300 according to embodiments herein and may be implemented with respect to cloud processing. The NBMP system 300 comprises an NBMP source 310, an NBMP workflow manager 320, a function repository 330, one or more media processing entities (MPE) 340, a media source 350, and a media sink 360. The NBMP source 310, NBMP workflow manager 320, function repository 330, MPE 340, media source 350, and media sink 360 may include or be implemented by at least one or more processors and memory that store code configured to cause the at least one or more processors to perform the functions of the NBMP source 310, NBMP workflow manager 320, function repository 330, MPE 340, media source 360, and media sink 360, respectively.

The NBMP source 310 may communicate work flow descriptions with the NBMP workflow manager 320 via a NBMP workflow API 311. The NBMP source 310 may also communicate function descriptions with the function repository 330 via a function discovery API 313. For example, the NBMP source 310 may send workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP workflow manager 320 may communicate with the function repository 330 via a function discovery API 312, which may be a same or different API from the function discovery API 313, and may communicate with one or more of the MPE 340 via an API 314 (e.g. an MPE API).

The media processing entities 340 may include one or more tasks 341. The NBMP workflow manager 320 may also communicate with the tasks 341 via API 315 (e.g. an NBMP Task API). The NBMP workflow manager 320 may use the API 315 to setup, configure, manage, and monitor one or more tasks 341 of a workflow that is performable by the one or more MPE 340. In order to configure, manage, and monitor tasks 341 of the workflow, the NBMP workflow manager 320 may send messages, such as requests, to one or more of the MPE 340 and/or the tasks 341, wherein each message may have several descriptors, each of which have several parameters. Additionally, the communications between the NBMP source 310, the NBMP workflow manager 320, the function repository 330, and the MPE 340 may be considered a control flow.

The tasks 341 may each include media processing functions 343 and configurations 342 for the media processing functions 343. Each of the tasks 341 in a respective media processing entity 340 may also communicate with each other facilitating data flow between tasks. In an embodiment, the NBMP workflow manager 320 may select the tasks based on the descriptions of the tasks in the WDD to search the function repository 330, via the function discovery API 312, to find the appropriate functions to run as tasks 341 for a current workflow. The one or more MPE 340 may be configured to receive media content from the media source 350, process the media content in accordance with the workflow, that includes tasks 341, created by the NBMP workflow manager 320, and output the processed media content to the media sink 360. In an embodiment, the one or more MPE 340 may be provided in parallel for multiple media flows 316 and 317 between the media source 350 and the media sink 360, respectively.

The media source 350 may include memory that stores media and may be integrated with or separate from the NBMP source 310. In an embodiment, the NBMP workflow manager 320 may notify the NBMP source 310 when a workflow is prepared and the media source 350 may transmit media content to the one or more MPE 340 based on the notification that the workflow is prepared and the one or more MPE 340 may transmit the media content to the media sink 360. The communications between the media source 350, the MPE 340, and the media sink 360 may be considered a data flow.

According to exemplary embodiments, a workflow, which is in process, may have to be updated due to some reasons, i.e., an increase in the volume of data. In such a case, one or more tasks of the workflow may need to be split to cope with the load increase, which making sure that no data is lost due to switching to a new workflow. According to an embodiment, the current tasks of the old workflow may be used in the updated workflow. According to an embodiment, switching from an old workflow to a new workflow need to occur simultaneously (or at the exact time) to ensure processes in the workflow are performed properly. Such processes may include processes for collecting data or billing, but the disclosure is not limited thereto.

According to an embodiment, an update to a workflow may be implemented using a scaling approach, a transition approach or a combination of both the scaling approach and the transition approach.

Scaling Approach

According to an embodiment, the scaling approach may include one of a switching functionality, a split merge functionality and a replacement functionality. However, the disclosure is not limited thereto, and as such, according to another embodiment, a combination of these functionalities, along with other functionalities may be used to implement the scaling approach.

Switching Functionality

According to an embodiment, the switching functionality may include switching one or more tasks from a first media processing entity (MPE) to a second MPE. For instance, the second MPE may be more powerful than the first MPE. That is, the second MPE may have more processing resources (i.e., memory elements and processor elements) that the first MPE. As such, the switching functionality may switch the one or more tasks from the first MPE to a more power second MPE. In such a case, data needs to be transferred from the one or more current task running on the current (first) MPE to a new (second) MPE running a new instance of task without loss of data.

According to an embodiment, the switching functionality can be defined by either the NBMP Client or the Workflow Manager. For instance, the NBMP Client or the Workflow Manager may implement the switching functionality based on a scale descriptor defining parameters to use during scaling or updating of the workflow.

Split-Merge Functionality

According to an embodiment, the split-merge functionality may include adding one or more parallel instances of a task in the workflow. For instance, for parallel processing of the task (and the data), a pair of splitter and merger functions may be added before and after the parallel tasks. Here, a single task may be split into multiple subtasks and processed independently. During the transition from a single task to multiple tasks, no data must be lost.

Figure 4:
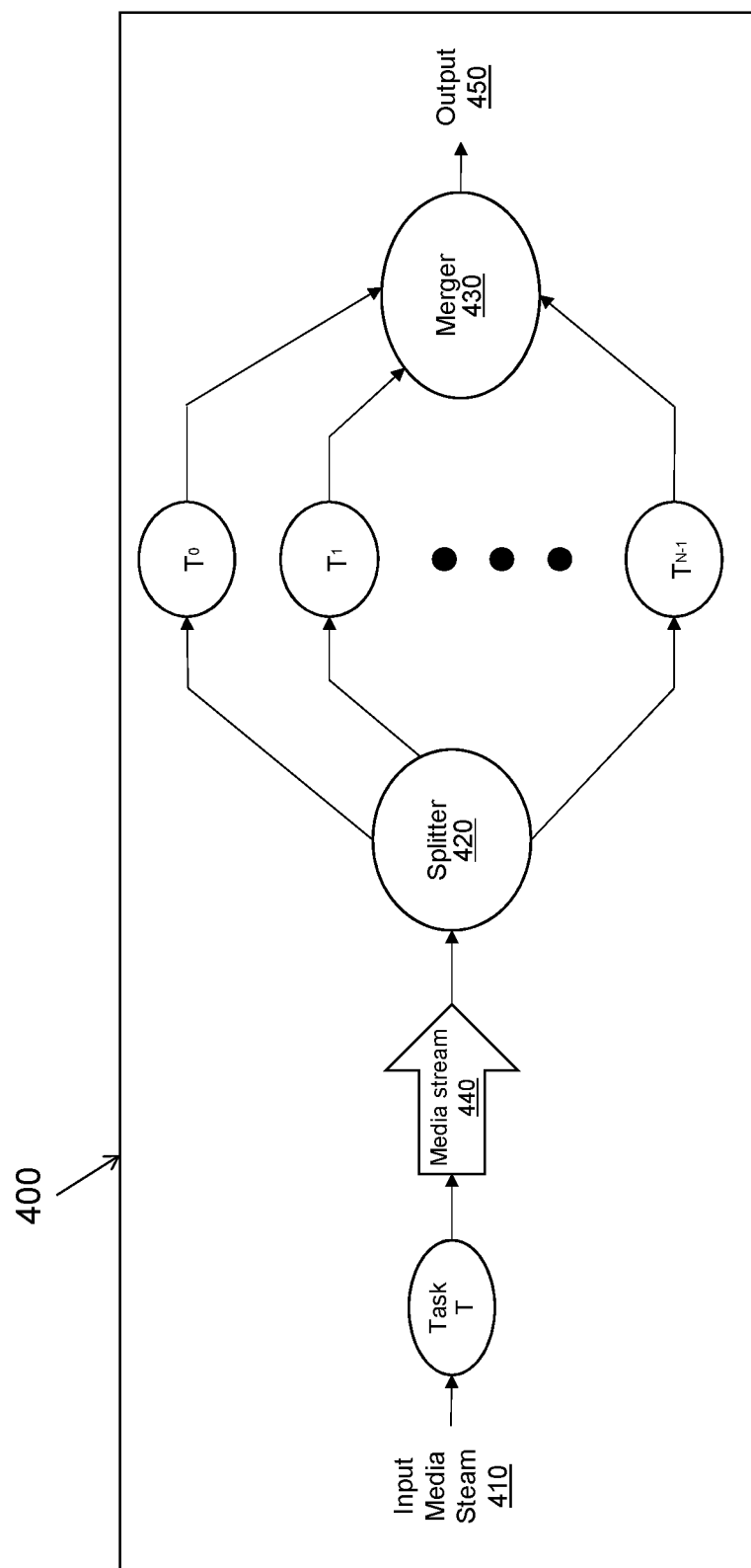
FIG. 4 is an example diagram of an NBMP splitter and merger process according to one or more embodiments.

FIG. 4 shows an example of NBMP splitting and merging segments of a media stream 440 of Task T for parallel processing according to an embodiment of the disclosure. As shown in FIG. 4, the NBMP splitter and merger process 400 includes a splitter 420 and a merger 430. In FIG. 4, Task T of an input media stream is converted to n instances of Task T (i.e., $T_0, \ldots, T_{N-1}$) with the n instances running in parallel. The input media stream 410 may be continuous. The splitter 420 converts the media stream to N media sub-streams. Each sub-stream is processed by an instance of T. The merger 430 then interleaves the sub-streams together to generate an output 450. The output 450 is the equivalent of the output stream of the Task T (i.e., media stream 440).

The 1:N splitter 420 and N:1 merger 430 functions, as shown in FIG. 4, work on the segment boundaries. Each segment has a start, duration, and length metadata associated with it. Since the segments are independent, consequently the sub-streams are independent of each other in terms of being processed by the Task T. In embodiments, Task $T_0, \ldots, T_{N-1}$, are instances of the task T and may process the segments at the same time or separately. Since the segments and sub-streams are independent, each instance of Task T (i.e., $T_0, \ldots, T_{N-1}$) may run at its own speed.

According to an embodiment, the split-merge functionality can be defined by either the NBMP Client or the Workflow Manager. For instance, the NBMP Client or the Workflow Manager may implement the split-merge functionality based on a scale descriptor defining parameters to use during scaling or updating of the workflow.

Replacement Functionality

According to an embodiment, the replacement functionality may include establishing a parallel workflow, and transferring data from a current workflow to the parallel workflow. In this case, during the transfer from the current workflow to the parallel workflow, no data should be lost.

According to an embodiment, the switching functionality can be defined by either the NBMP Client or the Workflow Manager. For instance, the NBMP Client or the Workflow Manager may implement the switching functionality based on a scale descriptor defining parameters to use during scaling or updating of the workflow.

Transition Approach

According to an embodiment, the transition approach may include one of a concurrent transition functionality or a sequential transition functionality. However, the disclosure is not limited thereto, and as such, according to another embodiment, a combination of these functionalities, along with other functionalities may be used to implement the transition approach.

Concurrent Transition Functionality

According to an embodiment, in the concurrent transition functionality, the new workflow or one or more new replacement tasks (i.e., referred to as the new entity), and the old workflow or one or more old tasks (i.e., referred to as the old entity) may receive at the same time. In this case, both the old entity and the new entity may receive data for a while at least until when the output data of the both the old entity and the new entity become identical. Thereafter, the old entity may be stopped, and the output from the new entity is used. That is, the old task, task group or workflow is stopped when the output data of the both the old entity and the new entity become identical.

According to an embodiment, the Workflow Manager or the cloud manager may be responsible for implementing the transitioning functionality. For instance, the Workflow Manager or the cloud manager may implement the concurrent functionality based on a scale descriptor defining parameters to use during the transition.

Sequential Transition Functionality

According to an embodiment, in the sequential transition functionality, the old task, group of tasks, or workflow (i.e., referred to as the old entity), is stopped processing data at some point. Thereafter, a new entity (i.e., a new task, a group of new tasks, or new workflow) takes over the processing of data from the point in which the old entity stopped processing the data. Here, the old entity and the new entity do not process data in in parallel. According to an embodiment, the sequential transition may be more efficient than the concurrent transition since multiple processes may not have to operate in parallel, which could require additional processing resources. In this regards, the sequential transition may also be more sophisticated than the concurrent transition in order to ensure that no data is lost during transition.

According to an embodiment, the Workflow Manager or the cloud manager may be responsible for implementing the transitioning functionality. For instance, the Workflow Manager or the cloud manager may implement the sequential transition functionality based on a scale descriptor defining parameters to use during the transition.

According to an embodiment, the functionalities of the scaling approaches (i.e., switching functionality, split-merge functionality, and replacement functionality) and the transition approaches (concurrent transition functionality and sequential transition functionality) may be implement by applying and/or leveraging the properties of the NBMP functions of the NBMP standard.

According to an embodiment, the processing of each data in an entity may have dependencies on previous data or the internal state of the entity, obtaining from the processing of the previous data. Therefore, immediate switching of an old entity to a new entity may not be possible.

According to an embodiment, in the NBMP function, the step descriptor defines the segment size of data by which the data can be processed independently. If all functions used in a group of tasks or workflow are step enabled, i.e. can process segments independently, then one can define a segment size for the group of tasks or workflow that the data processed independently segment to segment.

According to an embodiment, in the independent segment processing based on the step descriptor, each segment has the following metadata that defines the segment boundaries. For instance, according to an embodiment, in a method for signaling the segment boundaries using metadata, metadata maybe provided to define the segment start, segment duration and the segment size. Such a definition may be provided for any of the segments of Task T. For example, metadata definition may be as follows:

S: start of the segment in T scale.
D: duration of the segment in T scale.
L: Length of the segment in bytes
T: timescale (number of ticks in second)

According to the metadata based signal method, media stream input or output of any function shall have a corresponding metadata input or output that carries the segment boundaries metadata. As such, the splitting and merging segments of a media stream 440 of Task T for parallel processing may be performed properly when the step-based operation is performed in media processing on a cloud platform.

According to an embodiment, in order to use the segment metadata information, a function/task processing the data segment by segment, should receive the above metadata for its inputs as well as should include the metadata in its outputs.

According to an embodiment, the scaling approaches and the transition approaches discussed above may be applied together. For instance, the following Table 1 shows the possible application of the two transitioning methods to different scaling methods.

TABLE 1

| | Concurrent transition | Sequential transition |
|---|---|---|
| Switching functionality (i.e., to more powerful MPE) | Y | Y |
| Split-merge functionality | N | Y |
| Replacement functionality | Y | Y |

According to an embodiment, in any of the above transition methods, the Workflow Manager and cloud manager are responsible for implementing the transitioning. Moreover, the method of transition and the method of scale can be defined by either the NBMP Client or Workflow Manager.

According to an embodiment, in a case where the Workflow Manager and cloud manager are responsible deciding the method of transition and the method of scale, the Workflow Manager may decide how to scale the workflow, and what type of transition to use for the workflow. In particular, Workflow Manager may analyze the capabilities of the NBMP system, and depending on its capabilities, and depending on the level of scaling, the Workflow Manager may decide on the method of scaling and method of transition and only provides the result of the transition to NBMP Client.

According to an embodiment, in a case where the NBMP Client is responsible deciding the method of transition and the method of scale and the Workflow Manager is responsible for managing the workflow, the NBMP Client may define the method of scaling, and may also define the type of transition. The Workflow Manager may receive the request and responds if it can accommodate the request by analyzing the system capabilities. In this case, NBMP Client may optionally be informed about the Workflow Manager's capabilities of scaling and transitioning, before making its request.

According to an embodiment, in a case where the NBMP Client is responsible deciding the method of transition and the method of scale and the Workflow Manager is responsible for managing the workflow, the following information may be obtained to perform proper and seamless transition during an update to the workflow.

According to an embodiment, before transitioning to an updated workflow, if Workflow Manager is supporting the transitioning, information such as a type of transition, a type of scaling or resource availability may be obtained. However, this may be optional.

According to an embodiment, when a transitioning request is received, the Workflow Manager may obtain information such as whether the information provided is adequate for transitioning, and whether resources are available for the requested transitioning, whether the request can be accommodated. According to an embodiment, Workflow Manager may further obtain information on when the transitioning can be accommodated. However, this may be optional.

According to an embodiment, after the transitioning to the updated workflow, the Workflow Manager may obtain information such as whether the transition was successful, the timing of the transition and update information in the WDD.

According to an example embodiment, a scale descriptor may be added to NBMP Standard specification in the following manner:

TABLE 2

| Scale Descriptor | | |
|---|---|---|
| Parameter Name | Type | Cardinality |
| id | P | 1 |
| description | P | 0-1 |

TABLE 2-continued

| Scale Descriptor | | |
|---|---|---|
| Parameter Name | Type | Cardinality |
| scaling-type | P | 0-1 |
| scaling-factor | P | 0-1 |
| transition-type | P | 0-1 |
| switching-time | P | 0-1 |
| continuity | P | 0-1 |
| status | P | 0 |

Moreover, according to an example embodiment, detail definitions of the scale descriptor parameters for the NBMP Standard specification may be provided in the following manner:

TABLE 2

| Scale Parameters | | | | |
|---|---|---|---|---|
| Name | Definition | Unit | Type | Valid range |
| id | unique string indicating the scaling request in the scope of Workflow | N/A | string | N/A |
| description | a human-readable description for the scaling request | N/A | string | N/A |
| scaling-type | type of scaling request, one of the following values:<br>'MPE': scaling the resource by changing the MPE<br>'split-merge': adding parallel resources<br>'workflow': switching the entire workflow<br>The default value is 'MPE'. | N/A | string | N/A |
| scaling-factor | Factor of scaling. In the case of scaling-type 'MPE' or 'Workflow', this number indicate the speed/processing power factor of the new resource. In the case of 'split-merge', this number indicate the number of parallel resource (including existing one) after scaling. In this case, the integer part of number is only considered, and the smallest value is 1.<br>The default value is '1'. | URI | number | N/A |
| switching-time | Switching time of the resource to its update. If this value is in the past, then the switch should happen immediately and is updated with the exact switching time. If a lossless transition cannot occur at this time, then the switch should happen at the first possible time and is updated with the exact switching time.<br>The value is ignored is 'continuity' is 'false'. | As defined by RFC3339, section 5.6 | string | N/A |
| transition-type | Type of transition with one of the following value:<br>'concurrent': using parallel processing of the existing and updated resources, the resource usage might not be optimal during the transition<br>'sequential': running the existing and updated resource exclusively.<br>'both': supporting both concurrent and sequential transitions. This value may only used in the respond when the capabilities is requested. | N/A | string | N/A |
| continuity | Value 'true' indicates that this workflow update is a continuation of the previous workflow and no data shall be lost during switching.<br>The default value is 'false'. | N/A | boolean | N/A |
| status | Status of the scaling request, one of the following values:<br>'capabilities': request the capabilities<br>'consider': investigate whether such scaling is possible to accommodate<br>'request': request scaling | N/A | string | N/A |

TABLE 2-continued

Scale Parameters

| Name | Definition | Unit | Type | Valid range |
|------|------------|------|------|-------------|
| | 'passed': accommodated/possible to accommodate<br>'failed': failed/not possible<br>The default value is 'failed' | | | |

According to an embodiment, the NBMP Client may include scale descriptor in a WDD update call for the following: to get capabilities of Workflow Manager by including it in WDD and 'status'='capabilities', to scale Workflow by including it in WDD, scaling a task by including it in a TDD, to scale a group of tasks by including the scale descriptor in a Task group object and to consider scaling any of the above by requesting with 'status'='consider' to see if the workflow can manage to scale if it is requested.

Figure 5:
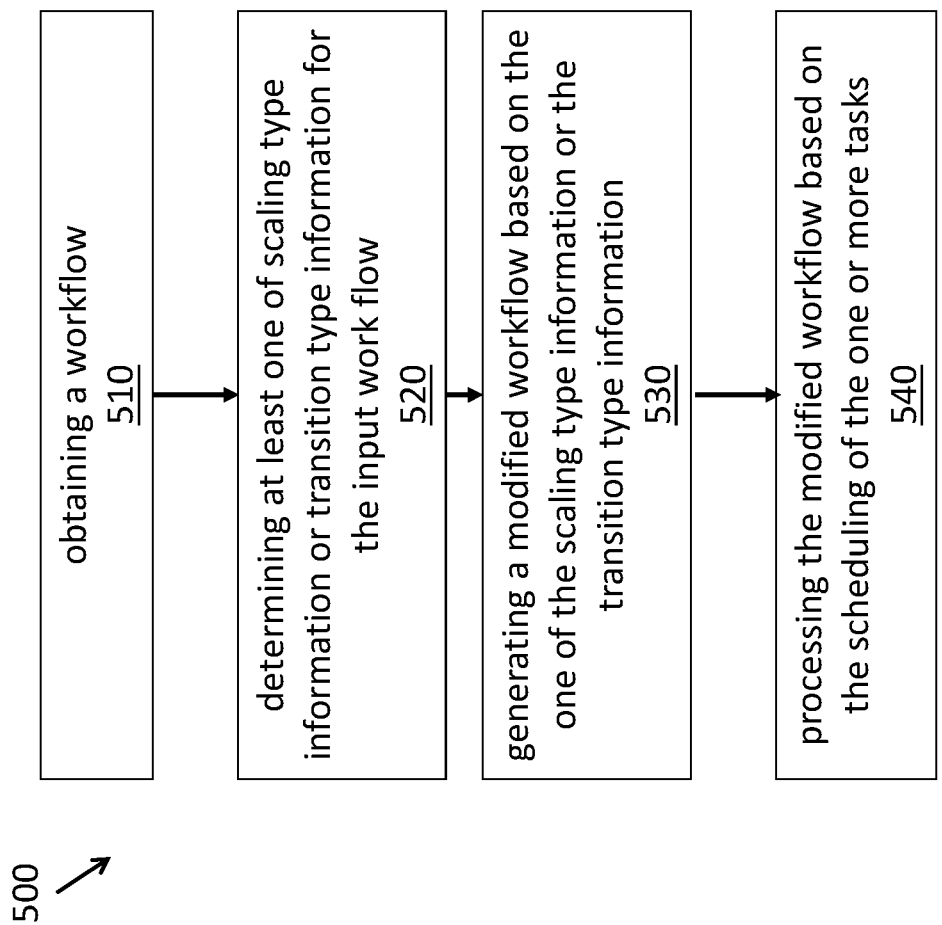
FIG. 5 is a block diagram of an example process for providing a seamless continuity in a workflow during an update in the workflow, according to one or more embodiments.

FIG. 5 is a flowchart of an example method 500 for scaling a Network Based Media Processing (NBMP) workflow on a cloud platform according to one or more embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes obtaining an input workflow including input media stream.

In operation 520, the method 500 includes determining at least one of scaling type information or transition type information for the input work flow. The scaling type information includes one of switch functionality information, slit-merge functionality or replacement functionality information, and the transition type information includes one of concurrent transition functionality information or concurrent transition functionality information.

In operation 530, the method 500 includes generating a updated workflow based on the determined at least one of the scaling type information or the transition type information.

In operation 540, the method 500 includes processing the updated workflow.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

Figure 6:
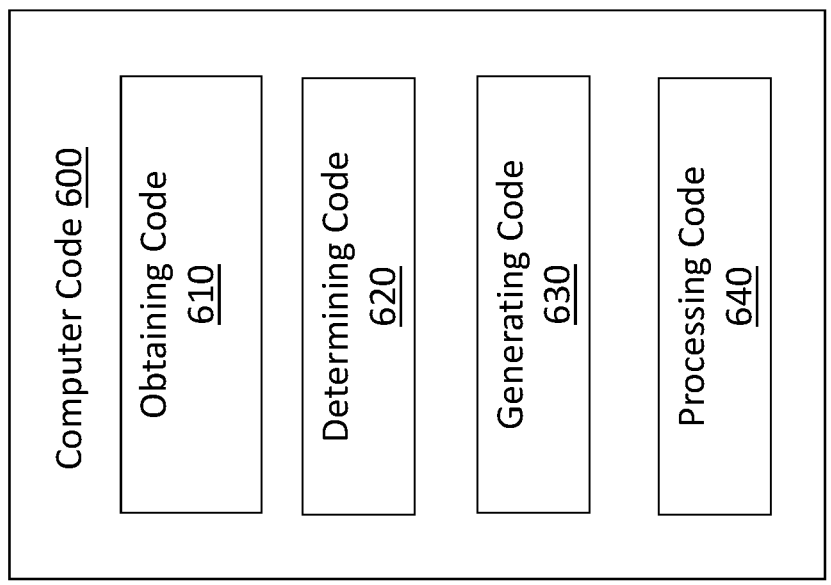
FIG. 6 is a block diagram of an example of computer code for providing a seamless continuity in a workflow during an update in the workflow, according to one or more embodiments.

FIG. 6 is a block diagram of an example of computer code for scaling a Network Based Media Processing (NBMP) workflow on a cloud platform according to one or more embodiments.

According to embodiments of the disclosure, at least one processor with memory storing computer code may be provided. The computer code may be configured to, when executed by the at least one processor, perform any number of aspects of the disclosure.

For example, with reference to FIG. 6, computer code 600 may be implemented in the NBMP system 300.

As shown in FIG. 6, the computer code 600 may include obtaining code 610, determining code 620, generating code 630 and processing code 640.

The obtaining code 610 may include code configured to cause the at least one processor to obtain an input workflow including input media stream.

The determining code 620 may include code configured to cause the at least one processor to determining at least one of scaling type information or transition type information for the input work flow.

The generating code 630 may include code configured to cause the at least one processor to generate a updated workflow based on the determined at least one of the scaling type information or the transition type information.

The processing code 640 may include code configured to cause the at least one processor to process the updated workflow based on the scheduling of the one or more tasks.

Although FIG. 6 shows example blocks of the computer code 600 of an apparatus or device according to embodiments, in some implementations, the apparatus may include additional blocks, fewer blocks, different blocks, or differently arranged blocks than those depicted in FIG. 6. Additionally, or alternatively, two or more of the blocks of the apparatus may be combined.

The techniques for scaling a Network Based Media Processing (NBMP) workflow on a cloud platform described above may be used separately or combined in any order. Further, each of the methods (or embodiments) may be implemented by processing circuitry (e.g., one or more processors or one or more integrated circuits). In one example, the one or more processors may execute a program that is stored in a non-transitory computer-readable medium.

The disclosure provides illustration and description, but is not intended to be exhaustive or to limit the implementations to the precise form disclosed. Modifications and variations are possible in light of the disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for scaling a Network Based Media Processing (NBMP) workflow on a cloud platform, the method comprising:
obtaining an input workflow including input media stream;
determining at least one of scaling type information or transition type information for the input workflow from a list of a plurality of scale parameters of the input workflow, parameter names of the list of the plurality of scale parameters consist of an id parameter, a description parameter, a scaling-type parameter, a scaling-factor parameter, a switching-time parameter, a transition-type parameter, a continuity parameter, and a status parameter, the transition-type parameter indicating any of a concurrent transition, a sequential transition, and a both transition, the concurrent transition indicating to implement parallel processing of resources, the sequential transition indicating to implement sequential processing of the resources, and the both transition indicating to implement both of the parallel processing and the sequential processing for respective ones of the resources;
generating, based at least on the transition-type parameter of the plurality of scale parameters, an updated workflow of the input workflow based on the determined at least one of the scaling type information or the transition type information, the updated workflow indicating at least one of the parallel processing, the sequential processing, and the both of the parallel processing and the sequential processing depending on determining which of the concurrent transition, the sequential transition, and the both transition are indicated by the transition-type parameter; and
processing the updated workflow by implementing the any of the concurrent transition, the sequential transition, and the both transition as indicated by the transition-type parameter.

2. The method of claim 1, wherein the scaling type information includes one of switch functionality information, slit-merge functionality or replacement functionality information.

3. The method of claim 2, wherein the switch functionality information defines a functionality for switching the input workflow from a first media processing entity (MPE) to a second MPE.

4. The method of claim 1, wherein the transition type information includes one of concurrent transition functionality information or sequential transition functionality information.

5. The method of claim 4, wherein the concurrent transition functionality information indicates that one or more tasks of the input workflow and one or more tasks of the updated workflow are executed in parallel for a period of time.

6. The method of claim 4, wherein the concurrent transition functionality information indicates that one or more tasks of the input workflow and one or more tasks of the updated workflow are executed in parallel until when output data of the both the input workflow and the updated workflow are same.

7. The method of claim 4, wherein the sequential transition functionality information indicates that, at one point in time, one or more tasks of the input workflow are switched to one or more tasks of the updated workflow.

8. The method of claim 1, wherein the scaling type information and the transition type information are included in a scale descriptor of the NBMP.

9. The method of claim 8, wherein the scale descriptor includes command information corresponding to the scaling type information or the transition type information, and
wherein the command information includes information for:
obtaining capabilities of the cloud platform,
determining whether the scaling type information or the transition type information in a scaling request is implementable; or
providing response including a result of the determining whether the scaling type information or the transition type information in the scaling request is implementable.

10. An apparatus for scaling a Network Based Media Processing (NBMP) workflow on a cloud platform, the apparatus comprising:
at least one memory configured to store program code; and
at least one processor configured to read the program code and operate as instructed by the program code, the program code including:
obtaining code configured to cause the at least one processor to obtain an input workflow including input media stream;
determining code configured to cause the at least one processor to determine at least one of scaling type information or transition type information for the input workflow from a list of a plurality of scale parameters of the input workflow, parameter names of the list of the plurality of scale parameters consist of an id parameter, a description parameter, a scaling-type parameter, a scaling-factor parameter, a switching-time parameter, a transition-type parameter, a continuity parameter, and a status parameter, the transition-type parameter indicating any of a concurrent transition, a sequential transition, and a both transition, the concurrent transition indicating to implement parallel processing of resources, the sequential transition indicating to implement sequential processing of the resources, and the both transition indicating to implement both of the parallel processing and the sequential processing for respective ones of the existing and updated resources;
generating code configured to cause the at least one processor to generate, based at least on the transition-type parameter of the plurality of scale parameters, an updated workflow of the input workflow based on the determined at least one of the scaling type information or the transition type information, the updated workflow indicating at least one of the parallel processing, the sequential processing, and the both of the parallel processing and the sequential processing depending on determining which of the concurrent transition, the sequential transition, and the both transition are indicated by the transition-type parameter; and processing code configured to cause the at least one processor to process the updated workflow by implementing the any of the concurrent transition, the sequential transition, and the both transition as indicated by the transition-type parameter.

11. The apparatus of claim 10, wherein the scaling type information includes one of switch functionality information, slit-merge functionality or replacement functionality information.

12. The apparatus of claim 11, wherein the switch functionality information defines a functionality for switching the input workflow from a first media processing entity (MPE) to a second MPE.

13. The apparatus of claim 10, wherein the transition type information includes one of concurrent transition functionality information or sequential transition functionality information.

14. The apparatus of claim 13, wherein the concurrent transition functionality information indicates that one or more tasks of the input workflow and one or more tasks of the updated workflow are executed in parallel for a period of time.

15. The apparatus of claim 13, wherein the concurrent transition functionality information indicates that one or more tasks of the input workflow and one or more tasks of the updated workflow are executed in parallel until when output data of the both the input workflow and the updated workflow are same.

16. The apparatus of claim 13, wherein the sequential transition functionality information indicates that, at one point in time, one or more tasks of the input workflow are switched to one or more tasks of the updated workflow.

17. The apparatus of claim 10, wherein the scaling type information and the transition type information are included in a scale descriptor of the NBMP.

18. The apparatus of claim 17, wherein the scale descriptor includes command information corresponding to the scaling type information or the transition type information, and wherein the command information includes information for:
obtaining capabilities of the cloud platform,
determining whether the scaling type information or the transition type information in a scaling request is implementable; or
providing response including a result of the determining whether the scaling type information or the transition type information in the scaling request is implementable.

19. A non-transitory computer readable medium storing instructions, the instructions comprising: one or more instructions that, when executed by at least one processor of an apparatus for scaling a Network Based Media Processing (NBMP) workflow on a cloud platform, cause the at least one processor to:

obtain an input workflow including input media stream;

determine at least one of scaling type information or transition type information for the input workflow from a list of a plurality of scale parameters of the input workflow, parameter names of the list of the plurality of scale parameters consist of an id parameter, a description parameter, a scaling-type parameter, a scaling-factor parameter, a switching-time parameter, a transition-type parameter, a continuity parameter, and a status parameter, the transition-type parameter indicating any of a concurrent transition, a sequential transition, and a both transition, the concurrent transition indicating to implement parallel processing of resources, the sequential transition indicating to implement sequential processing of the resources, and the both transition indicating to implement both of the parallel processing and the sequential processing for respective ones of the resources;

generate, based at least on the transition-type parameter of the plurality of scale parameters, an updated workflow of the input workflow based on the determined at least one of the scaling type information or the transition type information, the updated workflow indicating at least one of the parallel processing, the sequential processing, and the both of the parallel processing and the sequential processing depending on determining which of the concurrent transition, the sequential transition, and the both transition are indicated by the transition-type parameter; and process the updated workflow by implementing the any of the concurrent transition, the sequential transition, and the both transition as indicated by the transition-type parameter.

20. The non-transitory computer readable medium of claim 19, wherein the scaling type information includes one of switch functionality information, slit-merge functionality or replacement functionality information, and wherein the transition type information includes one of concurrent transition functionality information or concurrent transition functionality information.

* * * * *